United States Patent
Burgess

(10) Patent No.: US 7,284,243 B2
(45) Date of Patent: Oct. 16, 2007

(54) INSTALLING CONTENT SPECIFIC FILENAME SYSTEMS

(75) Inventor: Giles J. Burgess, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 785 days.

(21) Appl. No.: 10/263,310

(22) Filed: Oct. 3, 2002

(65) Prior Publication Data

US 2003/0028519 A1    Feb. 6, 2003

Related U.S. Application Data

(62) Division of application No. 09/447,787, filed on Nov. 23, 1999, now abandoned.

(51) Int. Cl.
G06F 9/445 (2006.01)
G06F 9/44 (2006.01)

(52) U.S. Cl. .................. 717/175; 717/176; 717/177

(58) Field of Classification Search ........ 717/168–178; 709/203, 213
See application file for complete search history.

(56) References Cited

U.S. PATENT DOCUMENTS

| | | | |
|---|---|---|---|
| 5,202,982 A | 4/1993 | Gramlich et al. | |
| 5,680,223 A | 10/1997 | Cooper et al. | |
| 5,806,072 A | 9/1998 | Kuba et al. | |
| 5,822,565 A | 10/1998 | DeRosa et al. | |
| 5,864,837 A | 1/1999 | Maimone | |
| 5,864,852 A | 1/1999 | Luotonen | |
| 5,956,724 A | 9/1999 | Griffiths | |
| 5,978,791 A | 11/1999 | Farber et al. | |
| 6,119,153 A | 9/2000 | Dujari et al. | |
| 6,151,708 A | 11/2000 | Pedrizetti et al. | |
| 6,202,070 B1* | 3/2001 | Nguyen et al. | 707/104.1 |
| 6,212,504 B1 | 4/2001 | Hayosh | |
| 6,279,155 B1* | 8/2001 | Amberg et al. | 717/174 |
| 6,279,156 B1* | 8/2001 | Amberg et al. | 717/124 |
| 6,292,880 B1 | 9/2001 | Mattis et al. | |
| 6,327,706 B1* | 12/2001 | Amberg et al. | 717/174 |
| 6,370,620 B1 | 4/2002 | Wu et al. | |
| 6,418,554 B1* | 7/2002 | Delo et al. | 717/174 |
| 6,560,776 B1* | 5/2003 | Breggin et al. | 717/176 |
| 6,606,744 B1* | 8/2003 | Mikurak | 717/174 |

(Continued)

FOREIGN PATENT DOCUMENTS

WO   WO 01/39043   5/2001

OTHER PUBLICATIONS

Vogels, "File system sage in Windows NT 4.0", ACM SOSP, pp. 93-109, 1999.*

(Continued)

*Primary Examiner*—Anil Khatri
(74) *Attorney, Agent, or Firm*—Banner & Witcoff, Ltd.

(57) ABSTRACT

A computer file naming technique employs content-specific filenames (CSFN's) that represent globally-unique identifiers for the contents of a file. Since file references incorporating the CSFN's are not location-specific, they offer unique advantages in the areas of file caching and file installation. Particularly, web browsers enabled to recognize CSFN's inherently verify the content of files when they are retrieved from a local cache, eliminating the need for comparison of file data or time stamps of the cached file copy and the server copy. Thus, file verification occurs solely in the local context. The invention includes caching and software installation systems that incorporate the benefits of CSFN's.

12 Claims, 5 Drawing Sheets

U.S. PATENT DOCUMENTS

| | | |
|---|---|---|
| 6,615,406 B1 * | 9/2003 | Amberg et al. ............. 717/177 |
| 6,738,970 B1 * | 5/2004 | Kruger et al. .............. 717/175 |
| 6,751,794 B1 * | 6/2004 | McCaleb et al. ........... 717/168 |
| 6,754,896 B2 * | 6/2004 | Mishra et al. .............. 717/176 |
| 6,757,894 B2 * | 6/2004 | Eylon et al. ................ 717/177 |
| 6,772,192 B1 * | 8/2004 | Fulton et al. ............... 709/203 |
| 6,789,252 B1 * | 9/2004 | Burke et al. ................ 717/100 |
| 6,889,249 B2 * | 5/2005 | Miloushev et al. ......... 709/213 |
| 6,904,449 B1 * | 6/2005 | Quinones ................... 709/203 |
| 6,978,454 B2 * | 12/2005 | Singleton ................... 717/175 |
| 7,073,172 B2 * | 7/2006 | Chamberlain .............. 717/169 |
| 2002/0083132 A1 | 6/2002 | Holland et al. |
| 2002/0147849 A1 | 10/2002 | Wong et al. |
| 2003/0046365 A1 | 3/2003 | Pfister et al. |
| 2003/0074394 A1 | 4/2003 | Eshghi |

OTHER PUBLICATIONS

Hollingsworth et al, "Using conent derived names for configuration management", ACM SSR, pp. 104-109, 1997.*

Anzbock et al, "Software configuation, distribution and deployment of web services", ACM SEKE, pp. 649-655, 2002.*

Cherkasova et al., "Analysis of enterprise medica server workloads: access patterns, locality, content evolution, and rates of changes", IEEE, TNET, pp. 781-794, 2003.*

Jeffrey Mogul and Arthur van Hoff, "Duplicate Suppression in HTTP," Networking Working Group/Internet-Draft, Apr. 15, 1998, 22 pages.

USPTO Office Action maildate Jun. 30, 2004; Abandoned U.S. Appl. No. 10/263,304.

* cited by examiner

INSTALLING CONTENT SPECIFIC FILENAME SYSTEMS

This application is a divisional of U.S. application Ser. No. 09/447,787 filed Nov. 23, 1999 now abandoned.

TECHNICAL FIELD

The invention relates to systems, including methods and apparatus, for generating computer filenames. The invention also relates to file caching and software installation systems. More particularly, the invention relates to systems for creating content-specific filenames and systems for using content-specific filenames, including file caching and software installation systems.

BACKGROUND OF THE INVENTION

Web browsers are software applications that enable users to download and view files from the many servers that make up the distributed network known as the World Wide Web. Generally, files are requested by specifying a Uniform Resource Locator (URL), which includes a particular file reference and a particular location (domain and path) on the network.

State-of-the art browsers provide file caching features which store recently downloaded files locally. As a user visits many different web pages or "surfs" the Web, hundreds of files may be cached. Some will be dynamic files that contain Hypertext Markup Language (HTML) that represents a web page that is frequently updated. The majority of files on the Web, however, are static files, whose content does not change. Examples include files representing graphic images that may be referenced by HTML files, for example, the banner advertisements that appear on various web pages on the Web. Cached files are stored locally under random filenames, assigned by the browser, which maintains a mapping file to map each filename to a corresponding URL. If a URL that corresponds to a cached file is again requested by the browser, the file can be retrieved much faster from local storage without resort to the network.

URL's are an example of location-specific file referencing techniques, which are used in virtually all known file retrieval systems. Location-specific file referencing systems specify files by their location, rather than by their contents. Since location-specific file references provide no specific indication of file contents, file referencing techniques that employ them must verify file contents by inference. This imposes limitations on the efficiency and dependability of file retrieval systems.

In browser caching systems, for example, since files are specified by their location, a browser is incapable of determining whether a cached file is current without comparing the cached file, or at least the attributes of the cached file, to the network copy of the file. To ensure that a file is current, browsers typically perform some type of verification that the contents of a particular cached file are identical to the contents of the file currently existing at a particular location on the network. In known caching systems, verification is usually done by comparing the time stamp of a cached file with the time stamp of the server copy of the file. In web browsers, this results in increased response times and network load.

Some efforts have been made to improve efficiencies of file caching systems, especially with regard to Internet browser applications. These efforts are exemplified in U.S. Pat. No. 5,864,837 to Maimone and U.S. Pat. No. 5,864,852 to Luotenen.

Maimone discloses methods and apparatus for verifying that cached copies of requested data objects are up-to-date using content-based signatures associated with cached and latest version (server) copies of requested data objects. The respective signatures are compared to determine whether the content of a cached copy of a data object is the same as the content of a server copy of that data object. Maimone suggests using checksums, message digests or hash functions to generate relatively unique numbers that define these signatures. Maimon's method of file verification requires the additional steps of generating, at both the client and server, content-based signatures. Thus, the operation of both the server and the client must be modified to incorporate Maimon's technique.

Luotenen describes a proxy server caching mechanism that generates a fingerprint based on an input URL. The disclosed system provides a way of organizing a cache using small entries that contain enough information about the URL associated with each cache file that the actual cache files need not be opened to accomplish discriminatory cache cleanup.

Mogul and van Hoff, in their publication entitled "Duplicate Suppression in HTTP" describe a technique for reducing the duplication of content; i.e., logos, backgrounds, bars, buttons, etc., in retrieved HTML and text documents on the Web. Using the technique of Mogul and van Hoff, any response whose message digest is equivalent to the message digest of the requested resource may be substituted. A proxy may check its cache to see if a cached instance of the resource has the identified message digest and, if it does, returns the cached resource to the client. To accomplish duplicate suppression, Mogul and van Hoff introduce an entity tag—"SubOK"—to be used in an HTTP "GET" request. The "SubOK" tag modifies a standard "GET" request such that a response whose message digest is the same as that specified in the "SubOK" field may be substituted for the resource specified by the "GET" command. Thus, the technique proposed by Mogul and van Hoff requires a transfer protocol that is a modified extension of a standard protocol that must reside on both the client and server. Moreover, their method requires the additional step of determining the message digest of the requested resource before substitution can occur. This additional step prevents back-compatibility of the technique of Mogul and van Hoff with existing software.

Despite past efforts, such as those of Maimone, Luotenen and Mogul and van Hoff to provide efficient caching systems, known systems still suffer from many of the limitations imposed by the use of location-specific file references. It would therefore be desirable to provide file referencing systems that do not inherently possess the limitations imposed by location-specific file references. It would further be desirable to provide caching systems that overcome the aforementioned inefficiencies associated with location-specific file referencing systems.

Like known caching systems, conventional software installation systems also suffer from the aforementioned limitations imposed by location-specific file referencing systems. Software installation typically involves copying a large number of computer files from a source medium to a target medium. Some of the files on the source medium may already exist on the target medium from previous installations of earlier versions of the software. Thus, some files may be unnecessarily copied during the installation process. Moreover, some previously installed files on the target medium may have filenames that are identical to filenames on the source medium, but the respective contents of these files may be different. Installation of the new files may therefore compromise the function of existing software that depends on the overwritten file. Known systems address this problem by comparing time stamps or other readily available parameters. These circumstances lead to inefficiencies in known software installation systems. It would therefore be desirable to provide a system installing new software files in such a way that eliminates the potential for overwriting files that are necessary to the function of existing software.

Another problem that characterizes known software installation systems is the necessity for a user to know in advance of the installation procedure, which features of a software application he or she will require. If a user later desires features which were not installed, he or she must re-install the software application and select those desired features. This requirement stems from the location-specific characteristics of known installation systems. For example, under the "WINDOWS" operating system, when a software package has been installed on a user's computer, the computer's Program Manager or Start Menu is provided with links (or shortcuts) to various components of the software for the purpose of starting execution of the software when a user selects an icon. In addition, numerous internal links are stored by the operating system to Dynamically Loadable Libraries (DLLs) and other ancillary files essential to the operation of the installed software. These file links are typically represented internally as conventional textual file references, i.e. file path and name. They are therefore location-specific. Because operation of the software is dependent on the stored links, and the stored links are location-specific, any change in the location of the software files will render the software non-functional. Since links are written to the operating system registry during software installation, a user must predict at installation which features of the software will be needed in order that the installation program may write the appropriate links to the operating system registry and make local copies of all files that are necessary for these features. If at a later time the user wishes to use other features of the software, or remove certain features in order to free local storage space, it is usually necessary for the user to re-install the software so that the operating system registry is updated to include location-specific links to the newly added support files.

It would therefore be desirable to provide a software installation system in which a user may access to all features of a software application, without having to initially install all of the software files on local storage. In particular, it would be desirable to provide a software system in which a large-capacity (but perhaps slower) storage location such as a remote server is used to store all of the software application files and provide for automatic caching of those files in local storage as necessary when a user desires selected features of the software. This would permit the user to have access to all features of the software without wasting local storage space on infrequently used files or files that are no longer used.

SUMMARY OF THE INVENTION

The invention introduces the concept of content-specific filenames (hereinafter "CSFN's")—filenames that uniquely characterize the file contents. A CSFN is a character string that represents file contents in a unique, or practically unique, manner. Since CSFN's are globally unique identifiers for the contents of respective files, they facilitate efficient verification of file contents and therefore efficient use of network and computer resources. The following description of exemplary systems according to the invention will utilize the terms "filename" and "file reference." The term "filename" is intended to describe a string of characters which are an attribute of a file stored on a computer system and which functions primarily to permit the computer system to distinguish between files for access and secondarily to permit human operators to associate a descriptive name with the file.

The term "file reference" is intended to more broadly describe any information that specifies a particular file, possibly by specifying a device and path in addition to a filename, for access. Thus, a "file reference" may contain a "filename."

One aspect of the invention contemplates systems for generating CSFN's. A message digest module, which may operate as a hash function, is applied to the variable length string defining the file contents, yielding a message digest. The message digest is preferably a long, typically 160-bit, binary number that uniquely characterizes the file contents. The message digest is then processed through a text encoder module to convert the binary number to a character string of predetermined length, which represents a legal filename that characterizes the file contents. A prefix may be provided in the character string to denote the filename as a CSFN. The message digest and therefore the CSFN, have the property of being practically unique to the file contents. That is, the possibility of the same filename being generated for different file contents is so remote that it is practically impossible. Thus, in a given computing environment, each CSFN provides a globally unique identifier for the contents of its associated file.

Another aspect of the invention contemplates file caching systems that utilize CSFN's. An exemplary caching system in a distributed network is configured to request files by specifying a CSFN. A first request for a file is made by an application by specifying a CSFN that is practically unique to that file. If the requested CSFN is not found in the local cache, it is retrieved from the file server and copied into the local cache. Since the CSFN is practically unique to the file contents, there is no need to verify the file contents when the file is later requested. According to another feature of the invention, caching systems may be configured to utilize CSFN's as well as conventional, location-specific file references by applying data verification techniques when appropriate.

Another aspect of the invention provides software installation systems that utilize CSFN's. Exemplary systems provide for the copying of files designated by CSFN's from a source medium, which may be a file server, to a target medium, which may be a local storage on a client computer. During the initial installation of the software, the operating system registry is provided with a listing of all of the CSFN's associated with the files required for all features of the application. When a user invokes the application at run-time, the operating system searches the target medium for the CSFN's associated with the files necessary to provide the particular features of the application that the user desires. If a particular CSFN is not found on the target medium, the operating system requests the file identified by the CSFN from the source medium and copies the file to the target medium. Thus, when a user desires to access particular additional features of an application or to remove files associated with particular unused features, the user does not need to re-install the application. The use of CSFN's in the exemplary software installation systems of the invention provide an added advantage of eliminating the potential for identical filenames for different file content. Thus, such systems eliminate the potential for reference to outdated or incompatible files when an application is executed.

Another aspect of the invention provides software installation systems that utilize CSFN's. Exemplary systems provide for the copying of files designated by CSFN's from a source medium, which may be a file server, to a target medium, which may be a local storage on a client computer. During the initial installation of the software, the operating system registry is provided with a listing of all of the CSFN's associated with the files required for all features of the application. When a user invokes the application at run-time, the operating system searches the target medium for the CSFN's associated with the files necessary to provide the particular features of the application that the user desires. If a particular CSFN is not found on the target medium, the operating system requests the file identified by the CSFN from the source medium and copies the file to the target medium. Thus, when a user desires to access particular additional features of an application or to remove files associated with particular unused features, the user does not need to re-install the application. The use of CSFN's in the exemplary software installation systems of the invention provides an added advantage of eliminating the potential for identical filenames for different file content. Thus, such systems eliminate the potential for reference to outdated or incompatible files when an application is executed.

In contrast to these known systems, a web browser utilizing CSFN's could quickly determine whether the cached and source files are identical by simply comparing their respective filenames. Moreover, if a CSFN is requested from a given source, but was previously cached from a different source, the CSFN-enabled browser would avoid unnecessarily downloading the file from the different source. Thus, unnecessary downloads and therefore network load, may be reduced. These advantages ultimately increase the performance and reliability of file caching systems, especially as CSFN's propagate throughout a given distributed network. Likewise, the efficiency and dependability of software installation systems are also increased by the use of CSFN's.

BRIEF DESCRIPTION OF THE DRAWINGS

The present invention is illustrated by way of example in the accompanying Figures, which should not be construed as limiting, in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
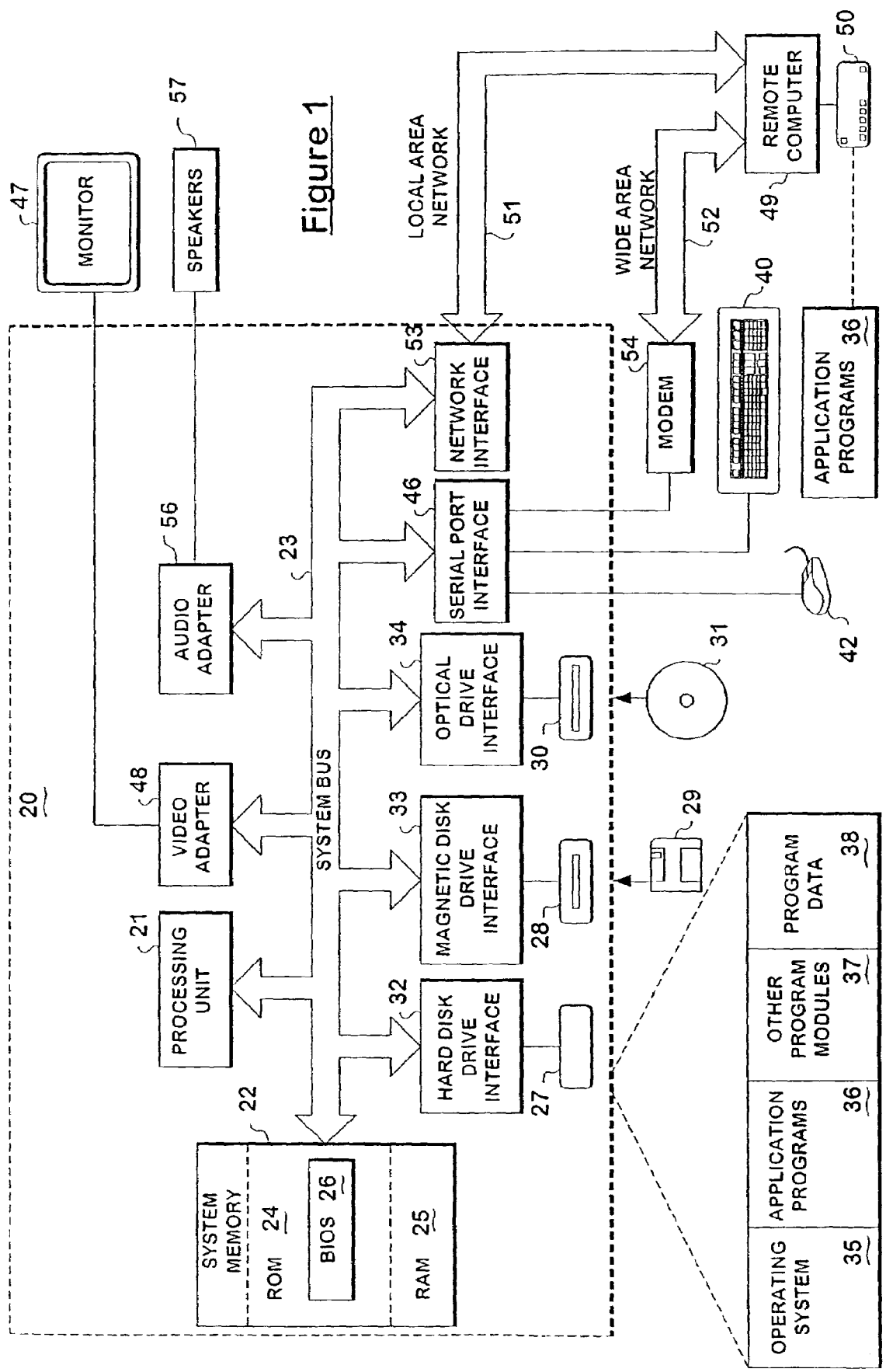
FIG. 1 is a schematic diagram of a conventional general-purpose digital computing environment that may be used to implement various aspects of the present invention.

FIG. 1 is a schematic diagram of a conventional general-purpose digital computing environment that can be used to implement various aspects of the invention. FIG. 1 and the following discussion are intended to provide a brief, general description of a suitable computing environment in which the invention may be implemented.

With reference to FIG. 1, an exemplary system for implementing the invention includes a general purpose computing device in the form of a conventional personal computer 20, having a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24.

The personal computer 20 further includes a hard disk drive 27 for reading from and writing to a hard disk (not shown). Also included are a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media are contemplated by the invention. For example, media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computer 49. Each remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 49 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2:
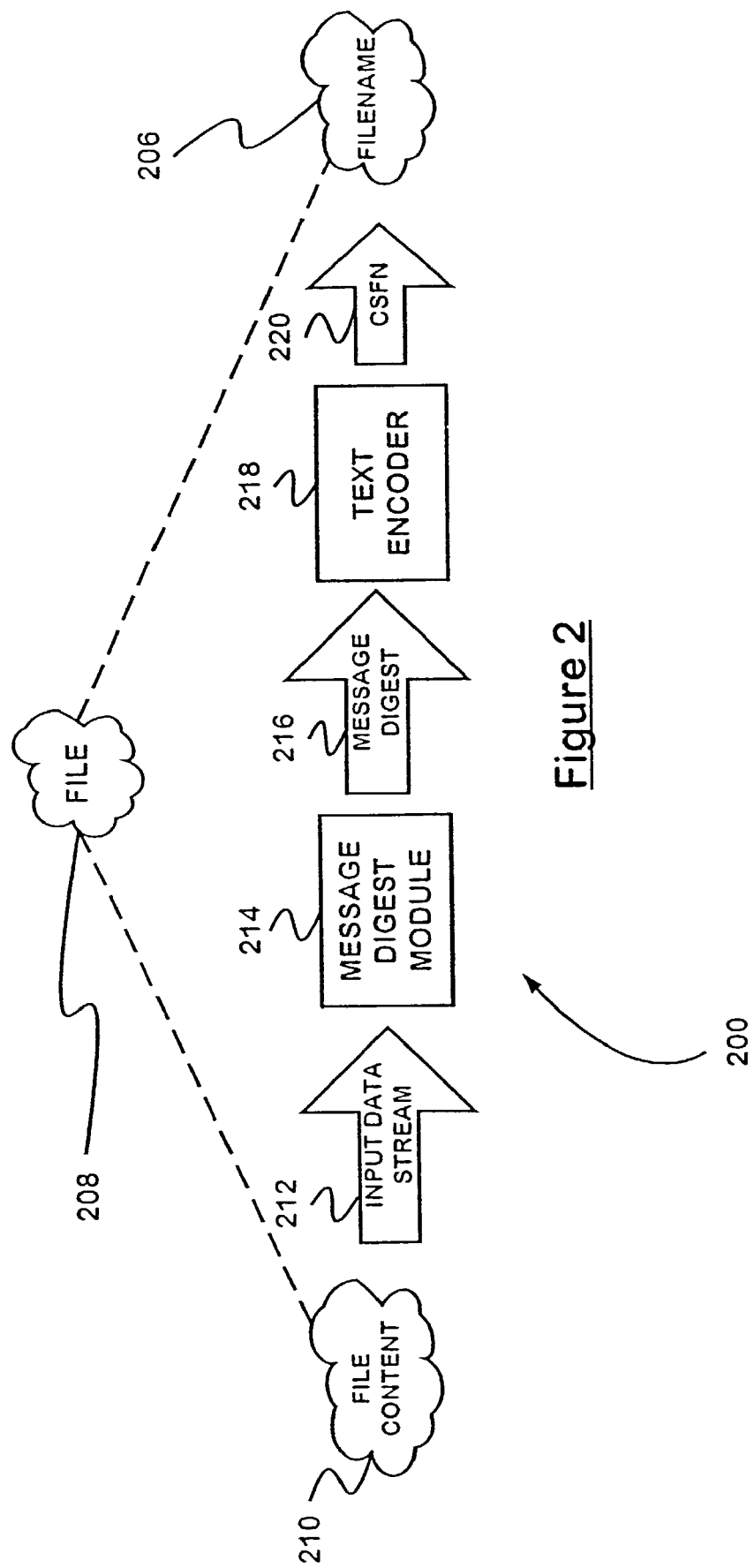
FIG. 2 is a block diagram illustrating an exemplary process for generating content-specific filenames according to the invention.

FIG. 2 illustrates an exemplary system 200 for creating CSFN's according to the invention. The system 200 may be implemented on a personal computer 20 (FIG. 1) described above. An arbitrary-length stream of data 212 defined by the file contents 210 is processed through a message digest module 214 to generate a message digest 216. It will be recognized that each computer file 208 has attributes which include the filename 206 and the file contents 210. The message digest 216 is a fixed-length binary number which is further processed through a text encoder module 218 to generate a CSFN 220. As illustrated in FIG. 2, the CSFN is now an attribute of the file 208.

Message digest module 214 produces an output number or message digest 216 based on an input stream of data 212 defined by the file contents. Preferably, message digest module 214 performs a hash function. Hash functions are well known in the art of cryptography and offer the advantage of making it virtually impossible to derive the original input data stream given only the output hash value. Hash functions are characterized by their ability to transform any length input string into an output string or number of fixed length. It will be recognized that hash functions which are strongly collision-free are best suited for generating CSFN's according to the invention. Collision-free hash functions are those for which it is computationally infeasible to find any two input messages that yield the same message digest. Conventional hash functions such as "MD5" protocol, which yields a 128-bit message digest, or "SHA" protocol, which yields a 160-bit message digest are suitable for generating CSFN's according to the invention. These protocols are merely exemplary and those of ordinary skill will recognize that other functions, including other hash functions, will be suitable for implementing the invention.

Due to its length, the message digest 216 must be modified to a character string of predetermined length. Text encoder module 218 accomplishes the task of encoding the message digest into a filename of fixed length. In a simple form, text encoder module 218 may convert the message digest into a hexadecimal number and truncate the resulting string to a predetermined length. The predetermined length will be governed by the applicable filename restrictions of the operating system of a particular environment. For example, under the WINDOWS 95 operating system with Long Filename (LFN) support, filenames can be up to 255 characters long. In Unix, the maximum length of a filename is 256 characters. Linux allows filenames to be up to 256 characters long.

Those of ordinary skill will recognize that one encoding scheme which may be used to implement CSFN's according to the invention would involve a hexadecimal representation of the message digest. This uses the 16 characters "0123456789abcdef". Thus, each four bits of a message digest could be represented by a single character and a 160-bit SHA digest encoded in hexadecimal would be 40 characters in length. It will further be recognized that, by using a greater range of ASCII characters, it is possible to shorten the generated CSFN somewhat. For instance, using a 32 character range such as: "0123456789abcdefghijklmnopqrstuv" would provide a five-bit representation scheme that encodes a 160-bit SHA digest into a 32-character string. In general, if a binary string of length L is encoded using C discreet symbols, the encoded digest will be a string of length: (L log 2)/(log C).

Preferably, the filename generated by the text encoder module 216 will include a standard prefix, for example, "% %" to permit CSFN's to be distinguished from other filename types. This distinction would permit various applications, such as web browsers, to recognize CSFN's and perform different file retrieval processes compared to processes for retrieving files having other filename types.

Figure 3:
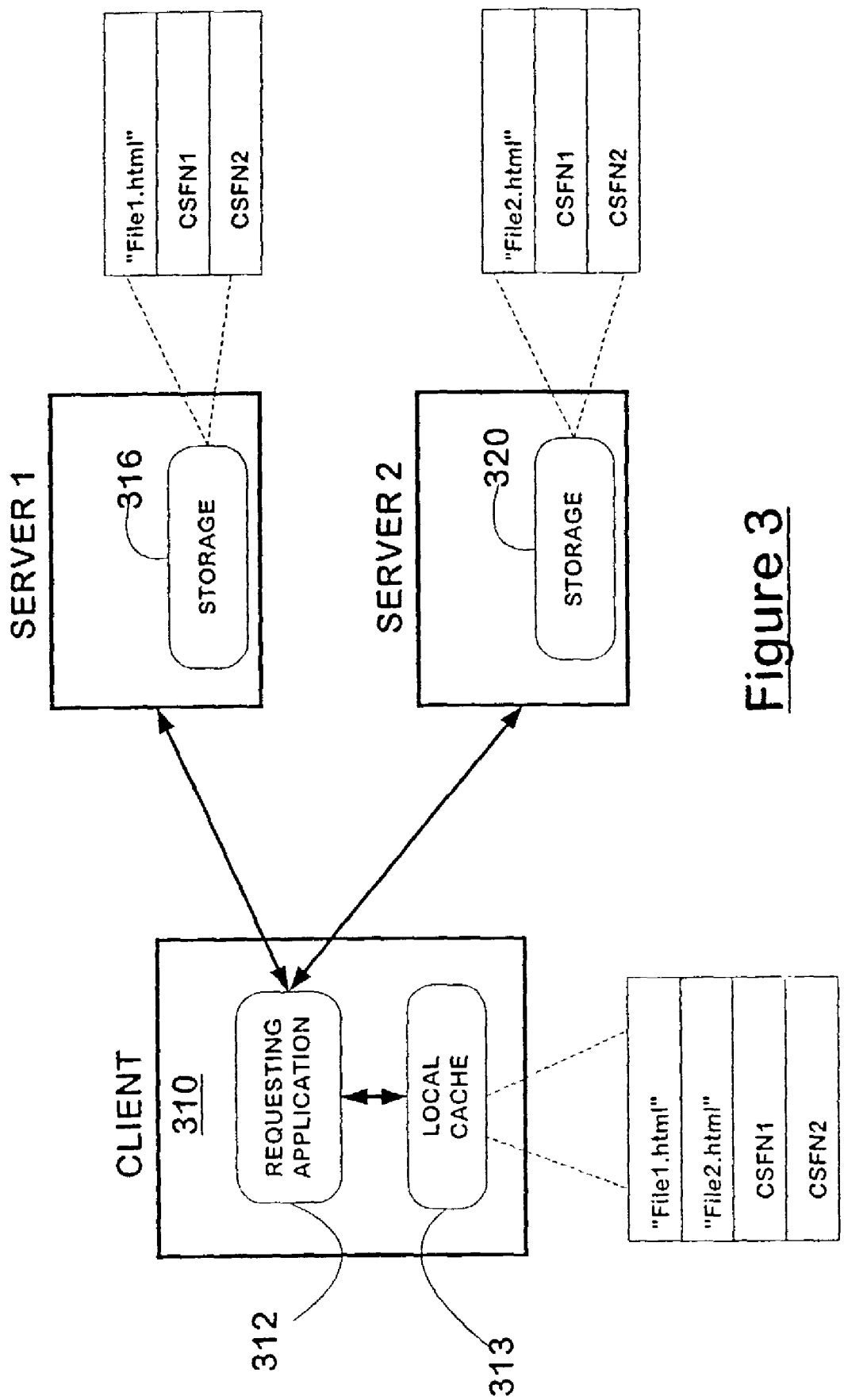
FIG. 3 illustrates an exemplary file caching system utilizing content-specific filenames according to the invention.

FIG. 3 schematically illustrates the components of a caching system utilizing CSFN's according to the invention. Client computer 310 is linked via a known communications link to a distributed network, including a number of servers, two of which are illustrated and designated Server 1 and Server 2. Client computer 310 executes at least one requesting application 312, which may be, for example, an Internet browser application. Storage for local cache 313 is provided on the hard disk drive 32 or RAM 25 (FIG. 1) for caching files. Similarly, Server 1 and Server 2 are each provided with a respective storage 316 and 320 for storing files.

Server 1 contains an HTML file named "File1.html" according to known naming conventions. Also stored on Server 1 are two graphic image files that are referenced in the HTML in "File1.html." These files are named, according to the invention, CSFN1 and CSFN2. They may contain, for example, graphic images of banner advertisements that are to appear on the web page defined by "File1.html." Those of ordinary skill will recognized that the notational form, "CSFNx" in this example, is used for simplicity. The actual filenames will be of the form" % % XXXXXX. ext" where "% %" is the CSFN-indicating prefix, "XXXXXX" is a character string generated according to the present invention and will vary greatly depending on file content. The extension ".ext" is a generic representation of a conventional extension used to denote a particular type of file, for example, ".jpg," for a well-known type of graphic image file.

As a result of a previous browsing session, in which "File1.html," and the two files designated CSFN1 and CSFN2 have been downloaded, those files are stored in local cache 313. In a later browsing session, the requesting application, as a result of a user inputting a corresponding URL, will again request "File1.html." Since this file is specified under conventional file referencing techniques, requesting application 312 will verify, using prior art verification techniques, that the cache copy of "File1.html" is the same as the copy of "File1.html" residing on Server 1.

The advantages of the invention are illustrated by the handling of the CSFN's in the case where the server copy of "File1.html" has been updated since the previous browsing session. In this case, the requesting application 312 will recognize, from a comparison of the time stamps of the cache copy of "File1.html" and the updated version of "File1.html" on Server 1 that the updated version must be downloaded.

[In accordance with the invention, the CSFN's of the graphic image files CSFN1 and CSFN2 eliminate the need for verification of these files when "File1.html" has been updated. The updated version of "File1.html" still contains references to the banner advertisement graphic images designated CSFN1 and CSFN2 since the update did not change these file references.] According to the invention, when processing "File1.html", the requesting application 312 will retrieve CSFN1 and CSFN2 from the local cache. There is no need to verify that these files are current because their content is verified by the existence of their filenames, CSFN1 and CSFN2 in the local cache. Thus, retrieval of the CSFN's from the cache inherently verifies the content of the files designated CSFN1 and CSFN2.

This contrasts with caching systems of the prior art. In such systems, if the updated version of "File1.html" references graphic image files, for example designated "graphic1.jpg" and "graphic2.jpg," these files would have to be verified as being current by comparing the time stamps of cached files "graphic1.jpg" and "graphic2.jpg" with their respective counterpart files on Server 1. That is, because the filename is not content-based, the possibility exists that a file on the server with the same name may be more current than the cache copy. In the prior art, in order to verify that the cache copy of the file is current, the browser must compare the content, or at least the time stamp, of the server copy with that of the cache copy.

To further illustrate the advantages of CSFN's, take the following two file references:

<www.myserver.com/public/$$a84e02c1fb59.htm>and
c-:-\documents\cache\$$a84e02c-1-fb59.htm These file references may refer to different physical storage locations. Yet both references contain the same filename ($$a84e02c1fb59.htm). Under known file referencing systems, evaluation, i.e. retrieval of the contents, of each of these file references does not imply that the same results will be produced. Evaluation of the references is time-variant. As with any prior art file reference, evaluation cannot be assumed to yield the same results when performed at different times. (The file may have been modified in the interim). In contrast to the time-variance that characterizes such prior art techniques, under the CSFN systems of the present invention, it can be inferred that the evaluation of both of the above file references is time-invariant, since the filenames are practically unique to the contents of the file.

Another advantage of the use of CSFN's according to the invention is also apparent from FIG. 3. Server 2 contains thereon a second HTML file named "File2.html" and containing pointers to two CSFN's; CSFN1 and CSFN2. These files are the same banner advertisement graphic image files contained in the file "File1.html." In the case where the requesting application 312 downloads "File2.html" from Server 2, the invention eliminates the need for repeated downloading of the graphic image files CSFN1 and CSFN2 from Server 2, since these files already reside in the cache 313. Since requesting application 312 is a CSFN enabled browser, when the HTML in "File2.html" is processed, CSFN1 and CSFN2 will be specified in the HTML file and therefore retrieved from the local cache 313. Inherently, CSFN1 in the cache 313 is identical to CSFN1 on Server 2 because both files have the same CSFN. The same can be said for CSFN2. Thus, the unnecessary downloading of CSFN1 and CSFN2 from Server 2 is eliminated by the exemplary caching system according to the invention. This example also illustrates how propagation of copies of files designated by CSFN's amongst large numbers of client computers ultimately results in less network load and more efficient distribution of files.

Figure 4:
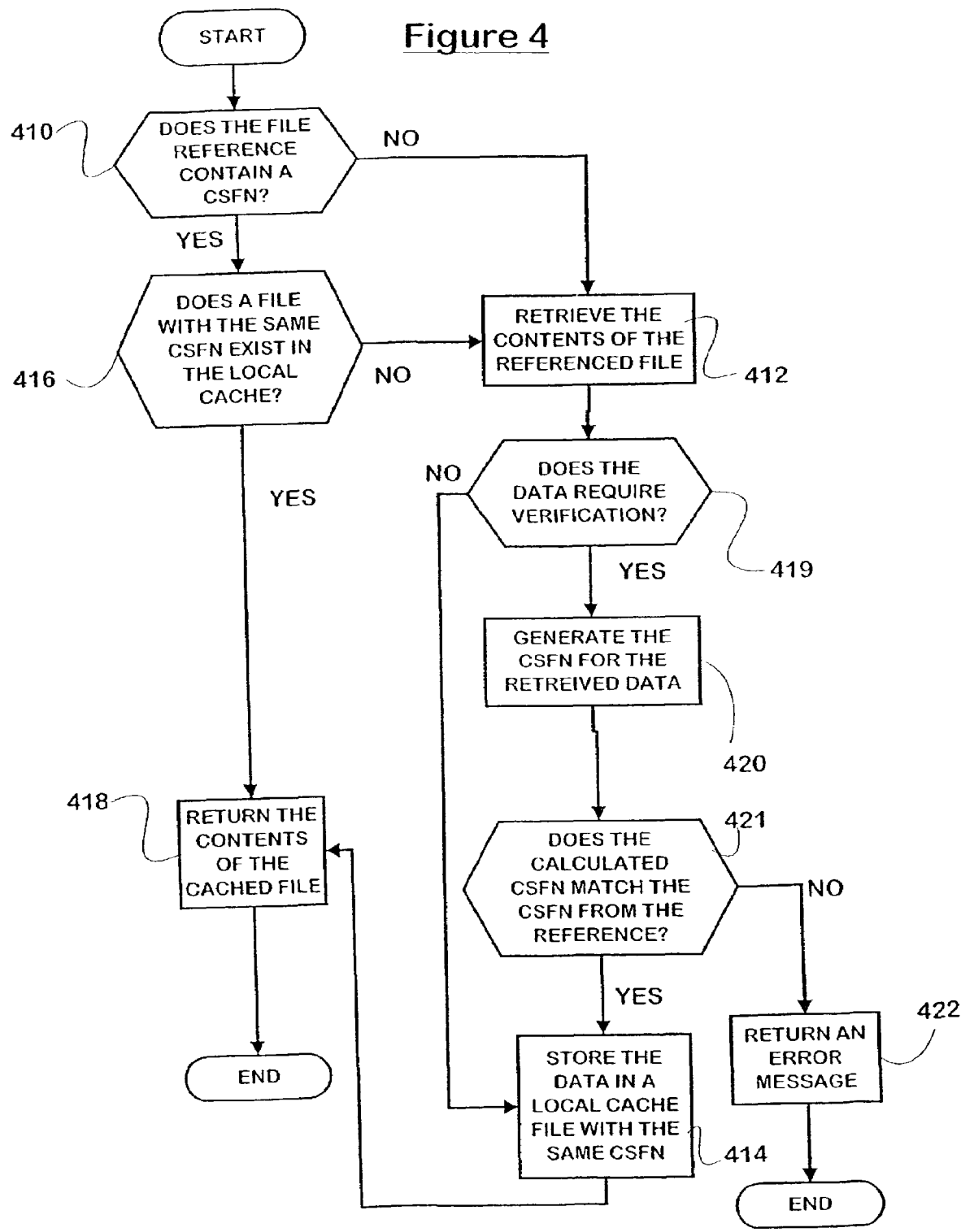
FIG. 4 illustrates an exemplary flow diagram for file caching using content-specific filenames according to the invention.

Operation of the exemplary caching system of FIG. 3 will be explained with additional reference to the flow diagram of FIG. 4. Upon the requesting application 312, such as a CSFN-enabled browser, issuing a request for a file reference, the browser first determines, at step 410, whether the file reference requested contains a CSFN. This may be determined by an examination of the prefix of the requested filename. If the requesting application 312 determines that the filename requested is not a CSFN, then the process branches to step 412 where the contents of the referenced file are downloaded from the location specified by the URL, for example. If at step 410 it is determined that the file reference requested contains a CSFN, then the process branches to step 416 where a determination is made as to whether a file with the referenced CSFN exists in the local cache.

If at step 416 it is determined that a file with the referenced the CSFN does not exist in the local cache, then the process branches to step 412 where the contents of the cached file are retrieved from the network by downloading. The process then proceeds to step 419 where a determination is made as to whether the contents of the retrieved file require verification. If not, the data is stored in the local cache as a file with a filename attribute equal to the CSFN and the process continues to step 418 where the contents of the cached file are returned to the browser. If, on the other hand, it is determined at step 419 that the data requires verification, at step 420 a CSFN is generated for the retrieved data content. The process continues to step 421 where a determination is made as to whether or not the calculated CSFN matches the CSFN contained in the file reference. If not, the process returns an error message at step 422 and then terminates. If the calculated CSFN and the file reference CSFN match, the process stores the verified data in the local cache at step 414 and proceeds to step 418 where the cached file contents are returned to the browser.

Figure 5:
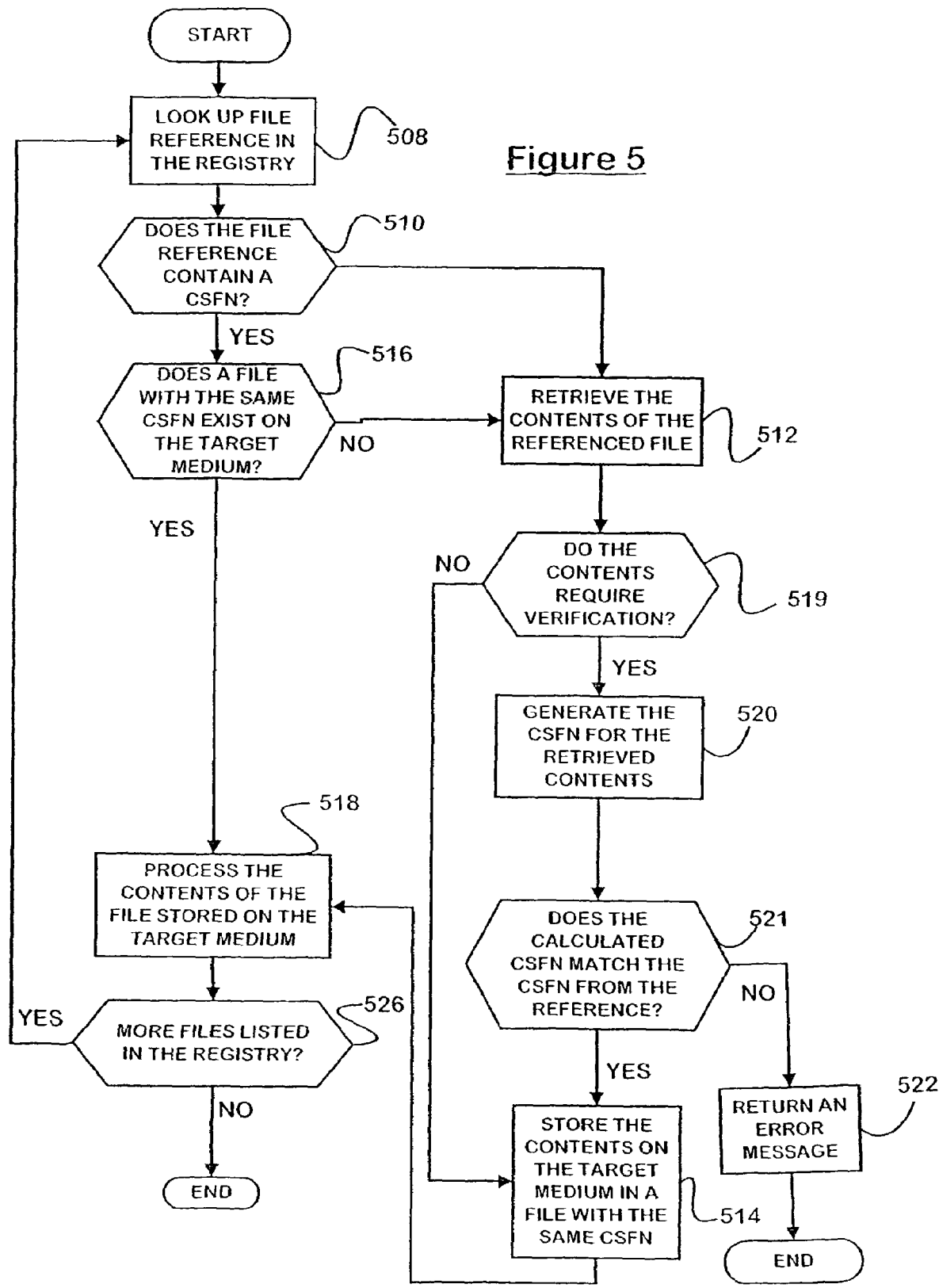
FIG. 5 illustrates an exemplary flow diagram for installing computer software using content-based filenames according to the invention.

FIG. 5 illustrates an exemplary software installation process according to the invention. The installation system provides for the on-demand caching of various files from a source medium, such as optical drive or CD-ROM 34 (FIG. 1) or removable disk 33 (FIG. 1) to a target medium, such as internal hard disk 33 (FIG. 1). The exemplary software installation process is equally applicable to installation that occurs over a distributed computing system or network, in which case the source medium may be a storage device on a file server, such as host computer 20 (FIG. 1) and the target medium is may be an internal hard disk or RAM on a remote computer, such as remote computer 49 (FIG. 1).

FIG. 5 illustrates an exemplary software installation process according to the invention. The installation system provides for the on-demand caching of various files from a source medium, such as optical drive or CD-ROM 34 (FIG. 1) or removable disk 33 (FIG. 1) to a target medium, such as internal hard disk 33 (FIG. 1). The exemplary software installation process is equally applicable to installation that occurs over a distributed computing system or network, in which case the source medium may be a storage device on a file server, such as host computer 20 (FIG. 1) and the target medium may be an internal hard disk or RAM on a remote computer, such as remote computer 49 (FIG. 1).

If at step 510, it is determined that the file reference contains a CSFN, then the process branches to step 516, where a determination is made as to whether or not a file with the same CSFN exists on the target medium. If not, the process branches to step 512 where the contents of the referenced file are retrieved from the source medium. If a file with the same CSFN exists at step 516, the process continues to step 518 where the contents of the file stored on the target medium are processed. The process then returns to step 508 if it is determined at step 526 that more files are listed in the registry.

A file verification routine is incorporated into the above process beginning at step 519, where a determination is made as to whether or not the contents of the referenced file require verification. If so, the process generates the CSFN for the retrieved contents at step 520 and determines at step 521 if the calculated CSFN matches the CSFN in the file reference. If not, the process returns an error message at step 522. If so, the process continues to step 514 where the contents of the file are stored on the target medium in a file with the same CSFN as the referenced file. If, at step 519, it is determined that the contents do not require verification, then the process skips steps 520, 521 and 522 and branches directly to step 514 where the contents of the referenced file are stored on the target medium.

It will be recognized by those of ordinary skill that the exemplary installation process described above permits files to be automatically cached on the target medium as necessary, thereby permitting a user to invoke any and all features of a software application without re-installing the software. Moreover, files associated with unwanted features may be removed from the local storage to free up storage space if necessary. Since the operating system is modified, according to the invention, to retrieve the requested files using a caching algorithm, all files necessary for a particular function are accessible from the remote computer without re-installing the software application.

Another advantage provided by the installation process described above is the practical elimination of the potential for duplicate filenames for files having different content. Since the filenames referenced in the registry links are content-specific, there is practically no possibility for the existence of a file reference to outdated or incompatible file content.

Although exemplary systems according to the invention have been described above, it should be appreciated that a variety of modifications will be readily available to persons utilizing the invention. The foregoing description is not intended to be limiting, but is merely illustrative of exemplary adaptations of the invention. Other products, apparatus and methods which incorporate modifications or changes to that which has been described herein are equally included within this application.

What is claimed is:

1. A method of installing computer software on a target computer having an operating system including a registry, the target computer having an associated target medium, the method comprising the steps of:

providing a listing of file references containing content-specific filenames stored in the registry of the target computer associated with the target medium;

determining at run time whether a file having one of the content-specific filenames in the listing is present on the target medium; and copying a file having the one content-specific filename from a source medium to the target medium upon determining at run time that the file having the one content-specific filename is not present on the target medium.

2. The method of claim 1, wherein the content-specific filename is a globally-unique identifier for the contents of the file.

3. The method of claim 1, further comprising the step of creating a content-specific filename prior to the step of providing a listing of file references containing content-specific filenames, the step of creating a content-specific filename comprising the further step of generating a character string by processing the contents of the file through a message digest module to create a message digest that characterizes the file contents.

4. The method of claim 3, further comprising the step of processing the message digest through a text encoder to create a character string of predetermined length.

5. The method of claim 4, wherein the text encoder provides a predetermined prefix in the character string.

6. The method of claim 1, wherein the content-specific filename is generated based on processing the contents of the file.

7. A tangible computer-readable storage medium having computer-executable instructions for performing the steps comprising:

providing a listing of content-specific filenames stored in a registry of a target computer associated a target medium;

determining at run time whether a file having one of the content-specific filenames in the listing is present on the target medium; and copying a file having the one content-specific filename from a source medium to the target medium upon determining at run time that the file having the one content-specific filename is not present on the target medium.

8. The computer-readable storage medium of claim 7, wherein the content-specific filename is a globally-unique identifier for the contents of the file.

9. The computer-readable storage medium of claim 7, wherein the steps further comprise the step of creating a content-specific filename prior to the step of providing a listing of content-specific filenames, the step of creating a content-specific filename comprising the further step of generating a character string by processing the contents of the file through a message digest module to create a message digest that characterizes the file contents.

10. The computer-readable storage medium of claim 9, wherein the steps further comprise the step of processing the message digest through a text encoder to create a character string of predetermined length.

11. The computer-readable storage medium of claim 10, wherein the text encoder provides a predetermined prefix in the character string.

12. The computer-readable storage medium of claim 7, wherein the content-specific filename is generated based on processing the contents of the file.

* * * * *